(12) United States Patent
Yuille et al.

(10) Patent No.: US 6,401,995 B1
(45) Date of Patent: Jun. 11, 2002

(54) COLLAPSIBLE STORAGE UNIT FOR A TRUCK

(76) Inventors: Kim W. Yuille, 79 Vernon Cir.; Adam A. Robertson, 305 Reno Dr., both of Lynchburg, VA (US) 24502

( * ) Notice: Subject to any disclaimer, the term of this patent is extended or adjusted under 35 U.S.C. 154(b) by 8 days.

(21) Appl. No.: 09/718,625

(22) Filed: Nov. 22, 2000

(51) Int. Cl.$^7$ .................................................. B60R 9/00
(52) U.S. Cl. ...................... 224/404; 224/498; 224/542; 224/551; 220/6; 220/7; 220/483
(58) Field of Search .............................. 224/4, 498, 403, 224/404, 550, 551, 554, 539, 542, 543; 220/6, 7, 480, 483; 190/9

(56) References Cited

U.S. PATENT DOCUMENTS

| | | | |
|---|---|---|---|
| 2,573,089 A | * | 10/1951 | Armenia |
| 3,330,437 A | * | 7/1967 | Bellamy |
| 3,613,931 A | | 10/1971 | Schifferle |
| 3,814,220 A | * | 6/1974 | Brody |
| 4,235,346 A | * | 11/1980 | Liggett |
| 4,815,593 A | | 3/1989 | Brown |
| 4,944,544 A | * | 7/1990 | Dick |
| 4,946,215 A | * | 8/1990 | Taylor |
| 5,169,200 A | | 12/1992 | Pugh |
| 5,186,510 A | * | 2/1993 | Stapp |
| 5,294,027 A | * | 3/1994 | Plastina |
| 5,299,704 A | * | 4/1994 | Thorby |
| D372,016 S | | 7/1996 | Wolford |
| 5,603,439 A | * | 2/1997 | Pineda |
| 5,743,584 A | * | 4/1998 | Lance et al. |
| 5,829,655 A | | 11/1998 | Salopek |
| 5,893,599 A | | 4/1999 | Strohfeldt |
| 6,056,177 A | * | 5/2000 | Schneider |
| 6,089,429 A | * | 7/2000 | Everson |
| 6,138,883 A | * | 10/2000 | Jackson et al. |

* cited by examiner

*Primary Examiner*—Gregory M. Vidovich

(57) ABSTRACT

A collapsible storage unit for a truck for providing a collapsible storage container for truck boxes. The collapsible storage unit for a truck includes a storage assembly including a box-like storage member having a bottom wall, a back wall being hingedly attached to the bottom wall, side walls being hingedly attached to the bottom wall, a front wall being hingedly attached to the bottom wall, and a lid being hingedly attached to the back wall with the side walls being removably fastened to the front and back walls; and also includes a hinge assembly for fastening the walls together to form the box-like storage member; and further includes a storage member securement assembly for securing the box-like storage member to side walls of a truck box.

9 Claims, 4 Drawing Sheets

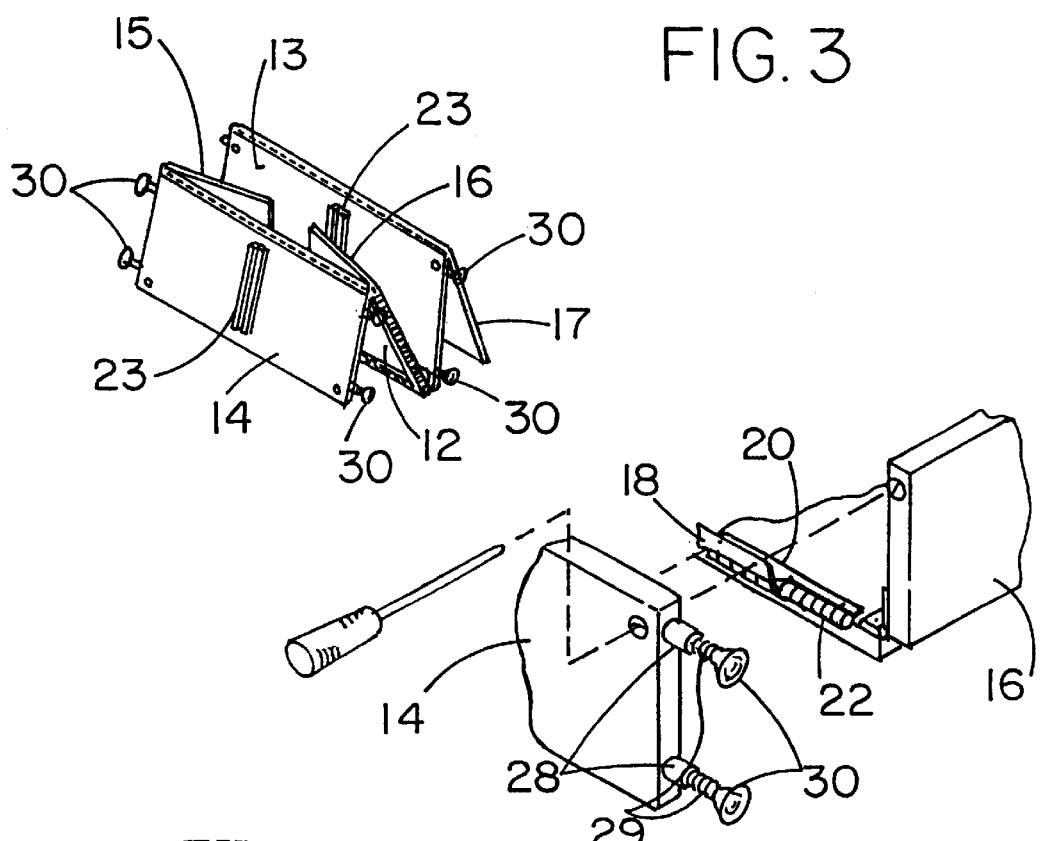
FIG. 3
FIG. 4
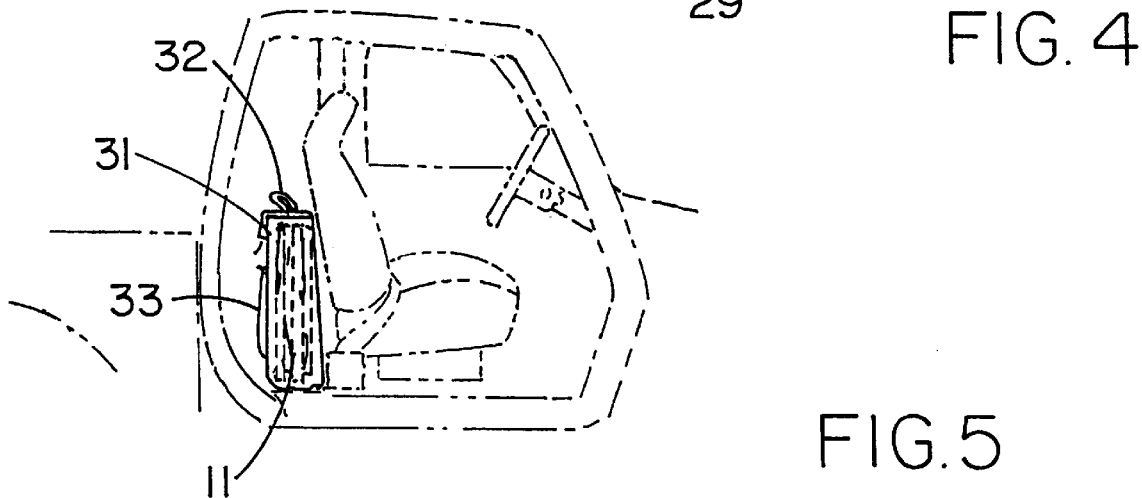
FIG. 5

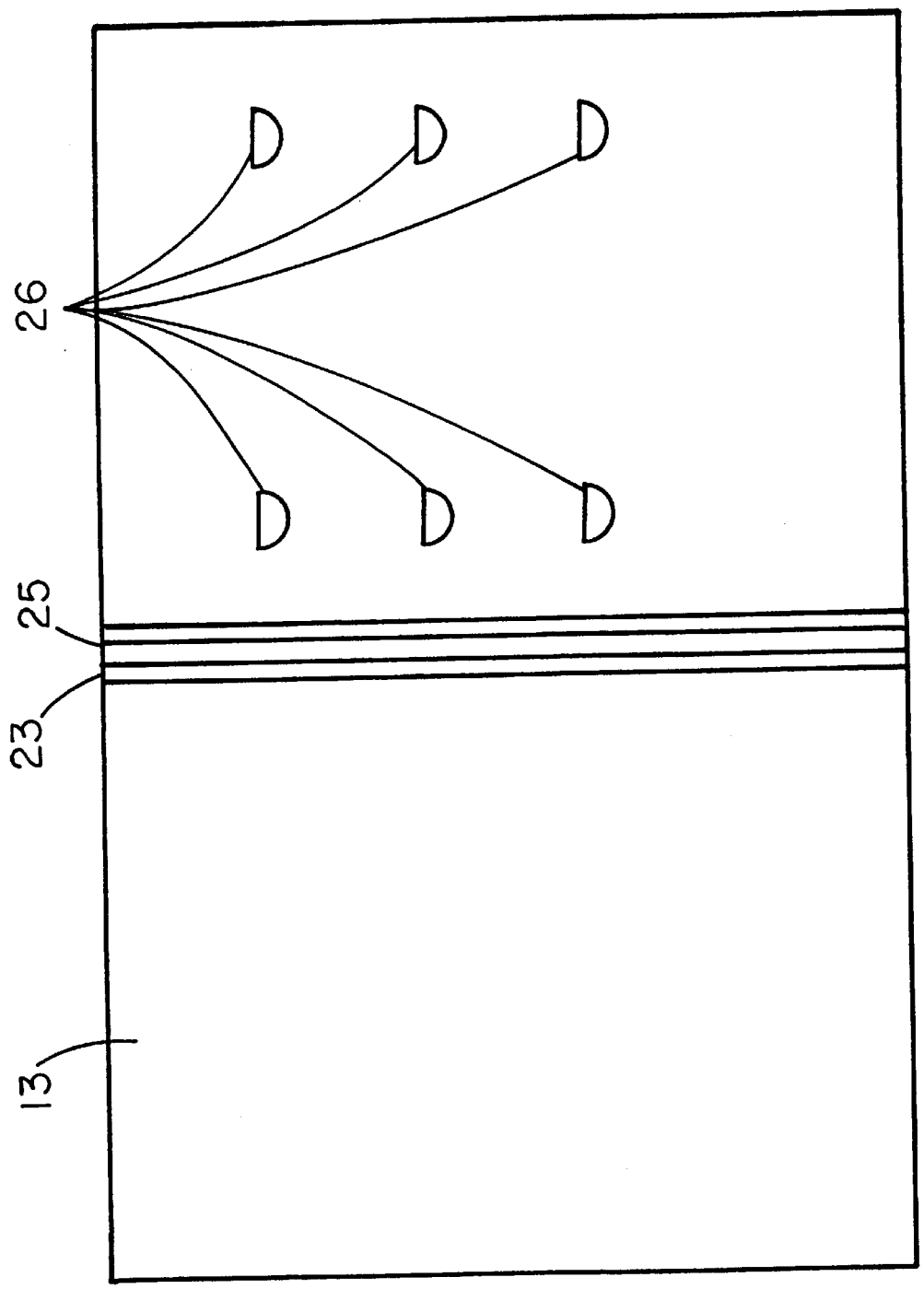

COLLAPSIBLE STORAGE UNIT FOR A TRUCK

BACKGROUND OF THE INVENTION

1. Field of the Invention

The present invention relates to a portable trunk for a truck and more particularly pertains to a new collapsible storage unit for a truck for providing a collapsible storage container for truck boxes.

2. Description of the Prior Art

The use of a portable trunk for a truck is known in the prior art. More specifically, a portable trunk for a truck heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,815,593; U.S. Pat. No. 3,613,931; U.S. Pat. No. 5,829,655; U.S. Pat. No. 5,893,599; U.S. Pat. No. 5,169,200; and U.S. Pat. No. Des. 372,016.

While these devices fulfill their respective, particular objectives and requirements, the aforementioned patents do not disclose a new collapsible storage unit for a truck. The inventive device includes a storage assembly including a box-like storage member having a bottom wall, a back wall being hingedly attached to the bottom wall, side walls being hingedly attached to the bottom wall, a front wall being hingedly attached to the bottom wall, and a lid being hingedly attached to the back wall with the side walls being removably fastened to the front and back walls; and also includes a hinge assembly for fastening the walls together to form the box-like storage member; and further includes a storage member securement assembly for securing the box-like storage member to side walls of a truck box.

In these respects, the collapsible storage unit for a truck according to the present invention substantially departs from the conventional concepts and designs of the prior art, and in so doing provides an apparatus primarily developed for the purpose of providing a collapsible storage container for truck boxes.

SUMMARY OF THE INVENTION

In view of the foregoing disadvantages inherent in the known types of portable trunk for a truck now present in the prior art, the present invention provides a new collapsible storage unit for a truck construction wherein the same can be utilized for providing a collapsible storage container for truck boxes.

The general purpose of the present invention, which will be described subsequently in greater detail, is to provide a new collapsible storage unit for a truck which has many of the advantages of the portable trunk for a truck mentioned heretofore and many novel features that result in a new collapsible storage unit for a truck which is not anticipated, rendered obvious, suggested, or even implied by any of the prior art portable trunk for a truck, either alone or in any combination thereof.

To attain this, the present invention generally comprises a storage assembly including a box-like storage member having a bottom wall, a back wall being hingedly attached to the bottom wall, side walls being hingedly attached to the bottom wall, a front wall being hingedly attached to the bottom wall, and a lid being hingedly attached to the back wall with the side walls being removably fastened to the front and back walls; and also includes a hinge assembly for fastening the walls together to form the box-like storage member; and further includes a storage member securement assembly for securing the box-like storage member to side walls of a truck box.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new collapsible storage unit for a truck which has many of the advantages of the portable trunk for a truck mentioned heretofore and many novel features that result in a new collapsible storage unit for a truck which is not anticipated, rendered obvious, suggested, or even implied by any of the prior art portable trunk for a truck, either alone or in any combination thereof.

It is another object of the present invention to provide a new collapsible storage unit for a truck which may be easily and efficiently manufactured and marketed.

It is a further object of the present invention to provide a new collapsible storage unit for a truck which is of a durable and reliable construction.

An even further object of the present invention is to provide a new collapsible storage unit for a truck which is susceptible of a low cost of manufacture with regard to both materials and labor, and which accordingly is then susceptible of low prices of sale to the consuming public, thereby making such collapsible storage unit for a truck economically available to the buying public.

Still yet another object of the present invention is to provide a new collapsible storage unit for a truck which provides in the apparatuses and methods of the prior art some of the advantages thereof, while simultaneously overcoming some of the disadvantages normally associated therewith.

Still another object of the present invention is to provide a new collapsible storage unit for a truck for providing a collapsible storage container for truck boxes.

Yet another object of the present invention is to provide a new collapsible storage unit for a truck which includes a storage assembly including a box-like storage member having a bottom wall, a back wall being hingedly attached to the bottom wall, side walls being hingedly attached to the bottom wall, a front wall being hingedly attached to the bottom wall, and a lid being hingedly attached to the back wall with the side walls being removably fastened to the front and back walls; and also includes a hinge assembly for fastening the walls together to form the box-like storage member; and further includes a storage member securement assembly for securing the box-like storage member to side walls of a truck box.

Still yet another object of the present invention is to provide a new collapsible storage unit for a truck that can be quickly and easily installed in a truck box within minutes.

Even still another object of the present invention is to provide a new collapsible storage unit for a truck that safely secures objects, items, and personal belongings in a truck so that they won't roll around and bang against the walls of the truck.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective view of the present invention being collapsed.

FIG. 4 is a partial exploded perspective view of two walls of the present invention.

FIG. 5 is a side elevational view of the present invention being collapsed in a truck.

FIG. 9 is another front elevational view of the present invention.

DESCRIPTION OF THE PREFERRED EMBODIMENT

Figure 1:
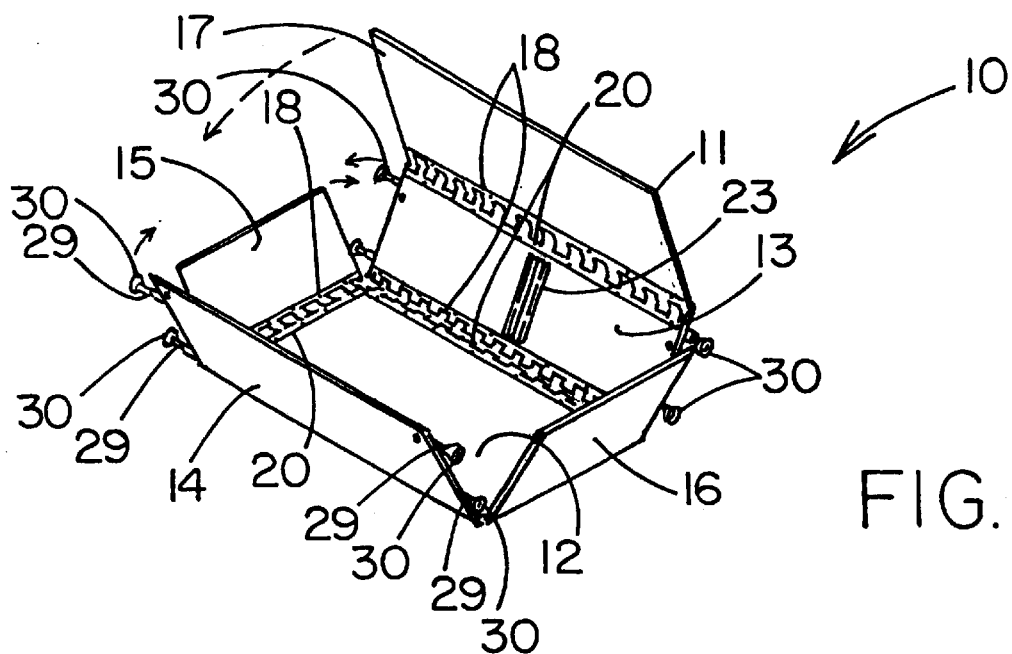
FIG. 1 is a perspective view of a new collapsible storage unit for a truck according to the present invention.
Figure 2:
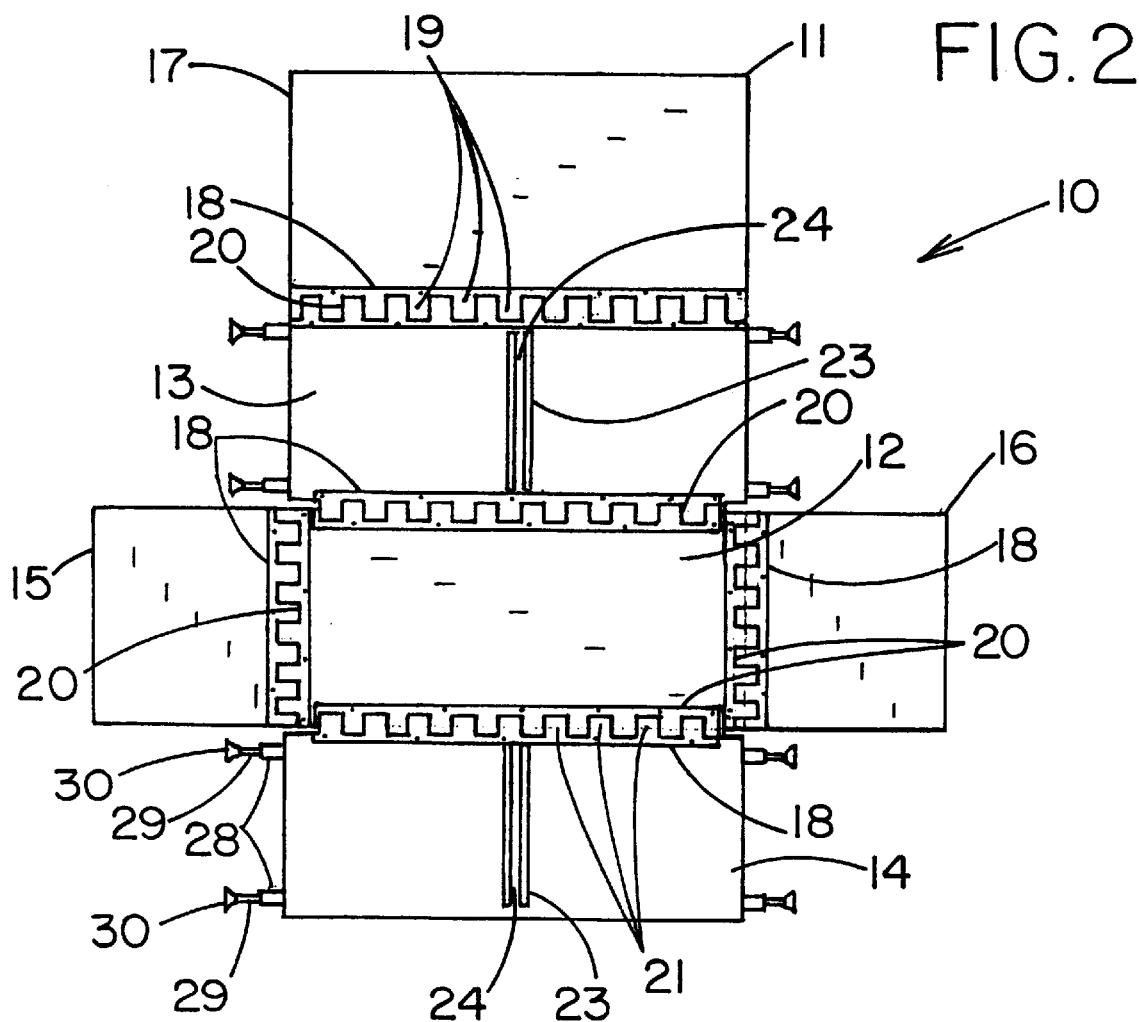
FIG. 2 is a top plan view of the present invention.

With reference now to the drawings, and in particular to FIGS. 1 through 9 thereof, a new collapsible storage unit for a truck embodying the principles and concepts of the present invention and generally designated by the reference numeral 10 will be described.

Figure 6:
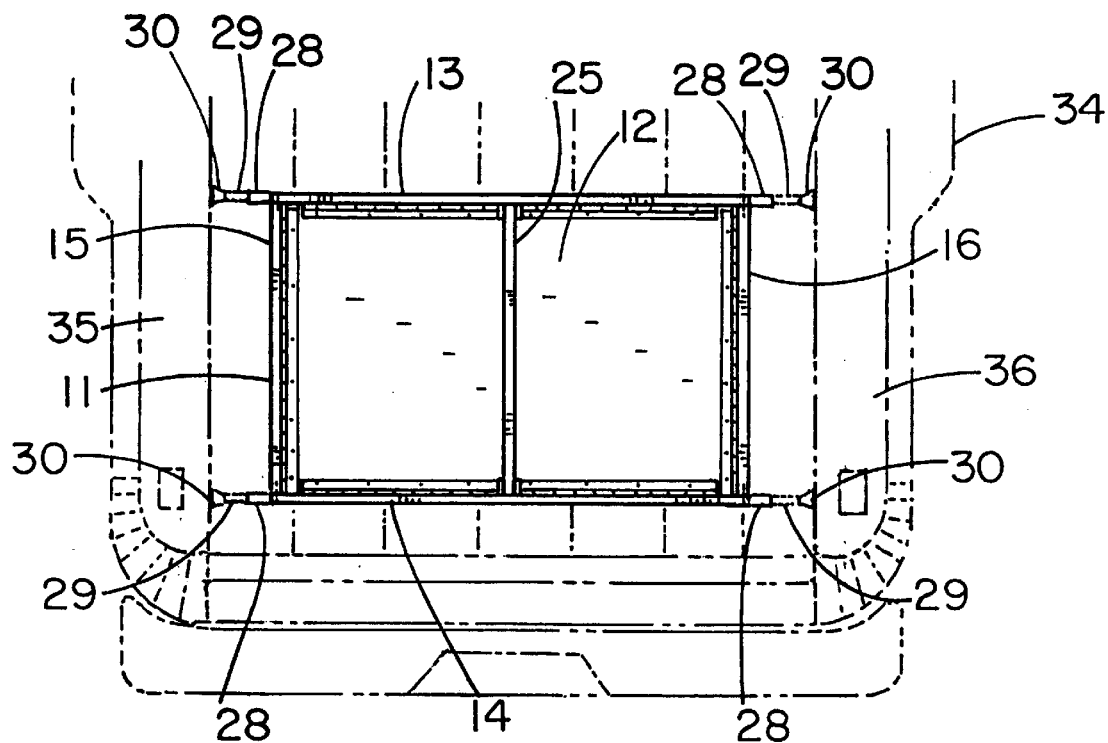
FIG. 6 is a top plan view of the present invention being used in a truck.
Figure 7:
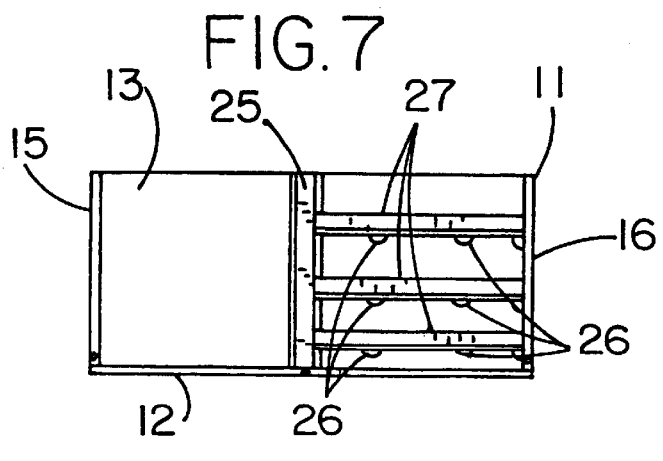
FIG. 7 is front elevational view of the present invention.
Figure 8:
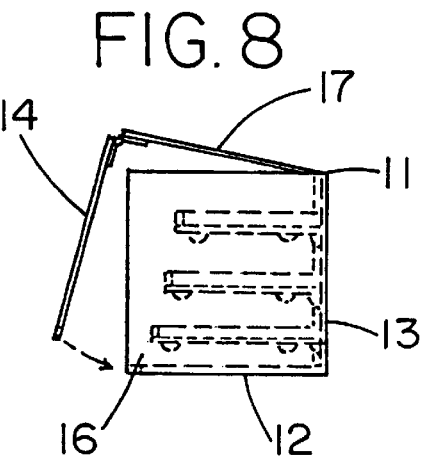
FIG. 8 is a side elevational view of the present invention.

As best illustrated in FIGS. 1 through 9, the collapsible storage unit for a truck 10 generally comprises a storage assembly including a box-like storage member 11 having a bottom wall 12, a back wall 13 being hingedly attached to the bottom wall 12, side walls 15,16 being hingedly attached to the bottom wall 12, a front wall 14 being hingedly attached to the bottom wall 12, and a lid 17 being hingedly attached to the back wall 13. As can be seen in FIG. 4, when storage member is erected to an in use position, as shown in FIG. 6, the side walls are removably fastened to the front and rear walls. The storage assembly includes elongate partition support members 23 being securely and conventionally attached to interior sides of the front and back walls 13,14, and also includes one or more partitions 25 being supported by the elongate partition support members 23 inside the box-like storage member 11. Each the elongate partition support members 23 has a longitudinal slot 24 disposed therein and being adapted to receive an end of a respective partition 25. The storage assembly further includes a plurality of shelf support members 26 being spaced about and being conventionally attached upon an interior of the back wall 13 and an interior of at least one of the side walls 15,16 inside the box-like storage member 11, and also includes shelf members 27 being removably mounted upon the shelf support members 26. Each of the shelf support members 26 is a semi-circular nodule member.

A hinge assembly for fastening the walls 12–17 together to form the box-like storage member 11 includes pairs of bracket members 18,20 and couplers 22 for coupling the pairs of bracket members 18,20 together. Each bracket member 18,20 is securely and conventionally attached along an edge of a respective wall 12–17. Each of the bracket members includes tubular projections 19,21 being spaced apart and being conventionally disposed along a longitudinal edge thereof with the tubular projections 19,21 being aligned end-to-end. Pairs of adjacent tubular projections 19 of a particular the bracket member 18 are adapted to receive the tubular projection 21 of an opposed bracket member 20 therebetween. The couplers 22 are bolt-like members which are removably disposed in the tubular projections 19,21 to couple the pairs of opposed bracket members 18,20 together.

A storage member securement assembly for securing the box-like storage member 11 to side walls 35,36 of a truck box of a truck 34 includes tubular members 28 being securely and conventionally attached along end edges of the front and back walls 13,14 and being extended outwardly therefrom, and also includes elongate members 29 being threaded in ends of the tubular members 28 and being adjustably extended from the tubular members 28, and further includes suction cup members 30 being securely attached to ends of the elongate members 29 and being adapted to attach to inner sides of the walls 35,36 of the truck box.

In use, the user assembles the walls 12–17 of the box-like storage member 11, and places the box-like storage member 11 in the truck box of the truck 34 and extends the elongate members 29 so that the suction cup members 30 engages the side walls 35,36 of the truck box. The user can store objects inside the box-like storage member 11 so that they don't roll around, and once finished the user can fold up the box-like storage member 11 and place it in a carrying case 31 having a handle member 32 and a pocket member 33, and place the carrying case 31 preferably inside the truck 34 behind the front seat until again needed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A collapsible storage unit for a truck comprising:
   a storage assembly including a box-shaped storage member having a bottom wall, a back wall being hingedly attached to said bottom wall, side walls being hingedly attached to said bottom wall, a front wall being hingedly attached to said bottom wall, and a lid being hingedly attached to said back wall;
   a fastening assembly for fastening said back and front walls to said side walls to form said box-shaped storage member; and
   a storage member securement assembly for securing said box-shaped storage member to side walls of a truck box, wherein said storage member securement assembly includes tubular members being securely attached along end edges of each of said front and back walls and being extended outwardly therefrom, and also includes elongate members being threaded in ends of said tubular members and being adjustably extended from said tubular members, and further includes suction cup members being securely attached to ends of said elongate members and being adapted to attach to inner sides of the walls of the truck box.

2. A collapsible storage unit for a truck as described in claim 1, wherein each of said hinge attachments includes pairs of opposed bracket members and couplers for coupling said pairs of opposed bracket members together, each said bracket member being securely attached along an edge of a respective said wall.

3. A collapsible storage unit for a truck as described in claim 2, wherein each of said bracket members includes tubular projections being spaced apart and being disposed along a longitudinal edge thereof, said tubular projections being aligned end-to-end, pairs of adjacent tubular projections of a particular said bracket member being adapted to receive said tubular projection of the other opposed said bracket member therebetween, said couplers being bolt-shaped members which are removably disposed in said tubular projections to couple said pairs of opposed bracket members together.

4. A collapsible storage unit for a truck as described in claim 1, further comprising a carrying case having a handle member and a pocket member wherein said storage unit, when collapsed, is placed in said carrying case.

5. A collapsible storage unit for a truck as described in claim 1, wherein said storage assembly includes elongate partition support members being securely attached to interior sides of said front and back walls, and also includes one or more partitions being supported by said elongate partition support members inside said box-shaped storage member.

6. A collapsible storage unit for a truck as described in claim 5, wherein each said elongate partition support members has a longitudinal slot disposed therein and being adapted to receive an end of a respective said partition.

7. A collapsible storage unit for a truck as described in claim 1, wherein said storage assembly further includes a plurality of shelf support members being spaced about and being disposed upon an interior of said back wall and an interior of at least one of said side walls inside said box-shaped storage member, and also includes shelf members being removably mounted upon said shelf support members.

8. A collapsible storage unit for a truck as described in claim 7, wherein each of said shelf support members is a semi-circular nodule member.

9. A collapsible storage unit for a truck comprising:
   a storage assembly including a box-shaped storage member having a bottom wall, a back wall being hingedly attached to said bottom wall, side walls being hingedly attached to said bottom wall, a front wall being hingedly attached to said bottom wall, and a lid being hingedly attached to said back wall, a fastening assembly for fastening said back and front walls to said side walls to form said box-shaped storage member, said storage assembly including elongate partition support members being securely attached to interior sides of said front and back walls, and also including one or more partitions being supported by said elongate partition support members inside said box-shaped storage member, each said elongate partition support members having a longitudinal slot disposed therein and being adapted to receive an end of a respective said partition, said storage assembly further including a plurality of shelf support members being spaced about and being disposed upon an interior of said back wall and an interior of at least one of said side walls inside said box-shaped storage member, and also including shelf members being removably mounted upon said shelf support members, each of said shelf support members being a semi-circular nodule member, said box-shaped storage member being collapsible, foldable, and storable in a carrying case having a handle member and a pocket member; each of said hinge attachments including pairs of opposed bracket members and couplers for coupling said pairs of opposed bracket members together, each said bracket member being apart and being disposed along a longitudinal edge thereof, said tubular projections being aligned end-to-end, pairs of adjacent tubular projections of a particular said bracket member being adapted to receive said tubular projection of the other opposed said bracket member therebetween, said couplers being bolt-like members which are removably disposed in said tubular projections to couple said pairs of opposed bracket members together; and
   a storage member securement assembly for securing said box-shaped storage member to side walls of a truck box, said storage member securement assembly including tubular members being securely attached along end edges of said front and back walls and being extended outwardly therefrom, and also including elongate members being threaded in ends of said tubular members and being adjustably extended from said tubular members, and further including suction cup members being securely attached to ends of each of said elongate members and being adapted to attach to inner sides of the walls of the truck box.

* * * * *